PATTERN RECOGNITION SYSTEM

Filed Nov. 30, 1965 3 Sheets-Sheet 1

INVENTOR.
ROBERT E. ATKINS
BY
ATTORNEY

INVENTOR.
ROBERT E. ATKINS
BY [signature]
ATTORNEY

INVENTOR.
ROBERT E. ATKINS
BY
ATTORNEY 3,483,512
PATTERN RECOGNITION SYSTEM
Robert E. Atkins, Rochester, N.Y., assignor to General Dynamics Corporation, a corporation of Delaware
Filed Nov. 30, 1965, Ser. No. 510,509
Int. Cl. G06k 9/02
U.S. Cl. 340—146.3 11 Claims

ABSTRACT OF THE DISCLOSURE

A pattern recognition system is described which operates serially on the observables which characterize a pattern. The analog signals corresponding to each observable are translated into a code. Weight selection matrices convert the code for each observable into a weight character which is shifted into a weight register. There is provision for a separate weight for every observable and every pattern to be recognized. A single register solely provides the entire memory for the weight characters. The weight characters are shifted out of the register into an accumulator which is capable of storing the sum of the weight characters which are read out of the register during each sequence or scan of the total number of observables. A bit is read out of the accumulator into an output register having a value which depends upon whether or not the accumulated sum allocated for the scan exceeds a threshold. The process is iterative for each of the patterns which are to be recognized and a successive weight selection matrix is used on each iteration. The value of the number stored in the output register, which contains a bit for each scan, therefore characterizes the pattern.

The present invention relates to pattern recognition systems and particularly to a system for recognizing patterns in which information is processed in accordance with digital data processing techniques.

The invention is especially suitable for use in high speed identification of alpha-numeric characters. However, the system is also suitable for use in identifying any pattern which may be translated into a plurality of observables. By observables are meant the characteristics inherent in a pattern, such for example as, the intensity of the light which is reflected from or transmitted through elemental areas of a visual pattern, or the amplitude of a frequency component of a speech pattern or signal.

A proposed pattern recognition technique uses a memory to store numerous sets of predetermined weights for each character to be classified. A weight is allocated to each observable and a large number of observables is required for the classification of numerous characters. The pattern under test is translated into its observables. Numerous threshold logic circuits divide upon the classification of the pattern under test using the weights stored in the memory. The accuracy of the classification, of course, depends upon the amount of information which is stored in the memory. In actual practice, therefore, the pattern recognition techniques outside of those used to recognize a limited number of characters of special shape make use of large digital computers having the requisite memory capacity. The cost and complexity of such pattern recognition systems has made them impractical, except if limited to a font of special characters.

Accordingly, it is an object of this invention to provide an improved pattern recognition system capable of classifying patterns without the need for a large amount of memory capacity.

It is another object of the present invention to provide an improved pattern recognition system which is lower in cost than prior systems.

It is still another object of the present invention to provide an improved pattern recognition system which may be adapted to have very high resolution or discrimination among different characteristics.

It is a further object of the present invention to provide a pattern recognition system which is adapted to use microelectronic circuitry and which therefore may be packaged in a small amount of space.

It is a still further object of the present invention to provide an improved pattern recognition system which makes efficient use of data processing operations so as to simplify and/or enlarge its capacity to recognize a large variety of patterns.

It is still a further object of the present invention to provide an improved pattern recognition system which can be implemented to use adaptive or learning techniques for the recognition of a large number of patterns.

Briefly described, a system for recognizing patterns in accordance with the invention utilizes a circuit which derives a sequence of digital codes corresponding to each observable of the pattern to be recognized. These digital codes may, for example, represent the significance of the observable in one dimension, say magnitude or intensity. An information storage device, which may be a register capable of storing a number having a plurality of bits is also provided. A matrix is used to set the register to represent digital values corresponding to the weight to be accorded to each observable in the pattern depending upon the digital code which represents that observable. Thus, a different numerical weight is set in the register depending upon the sequence in which the observable representing digital code occurs. Since the sequence represents the position of the observable in the pattern, and the digital code represents the significance of the observable, the value of the bits in the register which make up the weight are uniquely selected. Each weight is read out of the register before the next weight is set therein. The sum of the weights resulting from an entire sequence of codes is accumulated, say in a digital accumulator. The classification of the pattern is a function of the value of this sum. A digital comparator circuit may be used to identify the pattern on the basis of the sums exceeding a preset threshold for each output.

The invention itself, both as to its organization and method of operation, as well as additional objects and advantages thereof will become more readily apparent from a reading of the following description in connection with the accompanying drawings in which.

Figure 1:
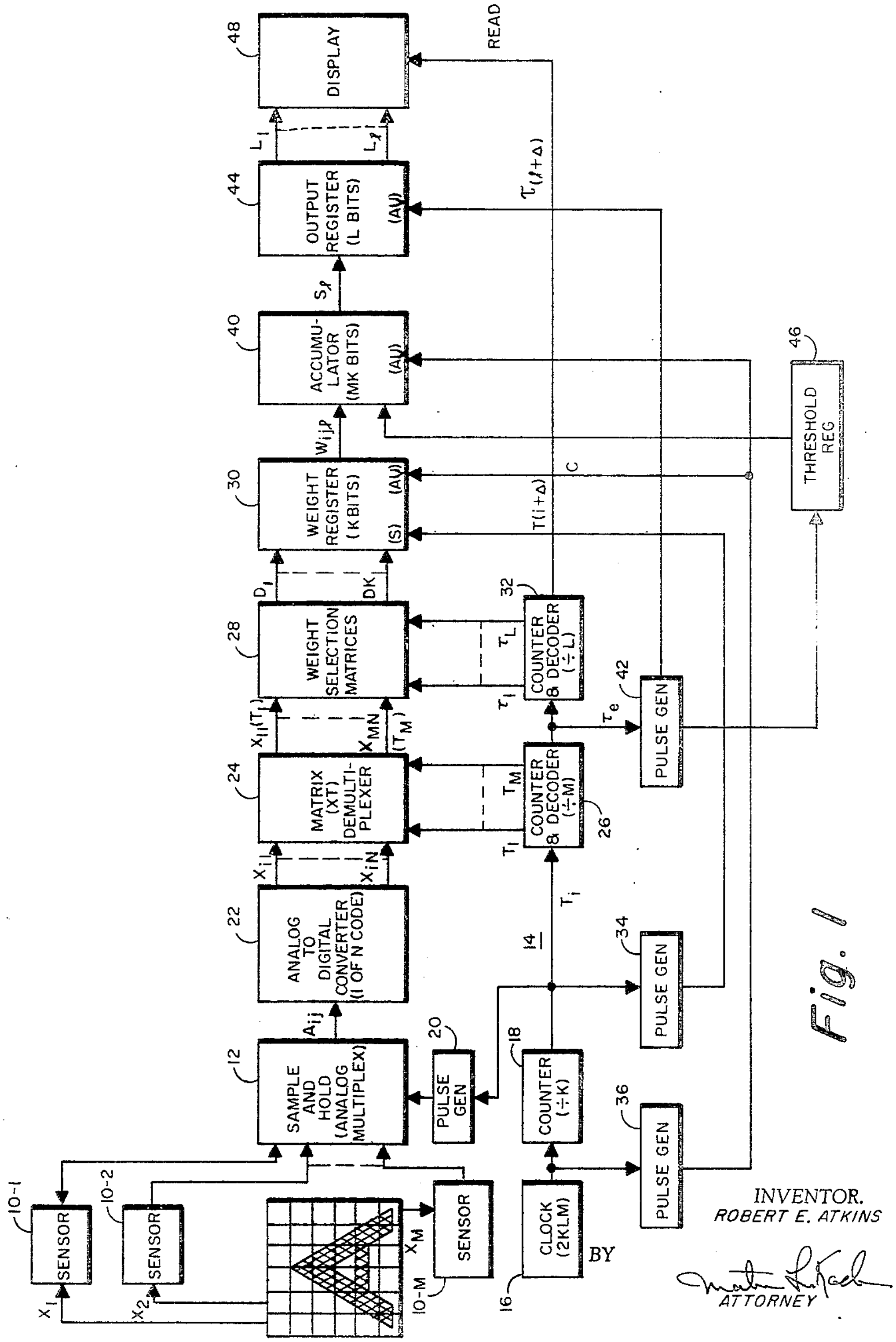
FIG. 1 is a block diagram of a pattern recognition system embodying the present invention.

Referring more particularly to FIG. 1, a pattern to be recognized is shown illustratively as the alpha-numeric "A." The observables of this pattern are the elemental areas 1, 2, 3 . . . M of a grid of areas. These areas provide inputs $X_1$, $X_2$ . . . $X_M$, which may be optical or light inputs corresponding to the ratio of black to white in each area. A separate sensor 10–1, 10–2 . . . 10–M, which may be a photocell, reads a different elemental area of the pattern. The outputs of the sensors are applied in parallel to a sample and hold circuit 12.

The circuit 12 is an analog multiplexing circuit which successively samples the analog inputs thereto from the sensors 10–1 to 10–M. As each input is sampled, a voltage corresponding to the amplitude thereof is held by the circuit for a fixed time interval. In one form, the sample and hold circuit 12 may be a stepping switch which is operated by an input pulse train to sequentially connect the outputs of each of the sensors to a capacitor. First the sensor 10–1 is connected. Then the sensor 10–2 is connected to the capacitor. The other sensors 10 are connected in turn to the capacitor, each upon occurrence of a successive pulse in the train. Finally, the sensor X–M is connected to the capacitor to complete the sequence. The voltage level to which the capacitor is charged is a function of the voltage output of the sensor. After the last sensor 10–M is connected to the capacitor, the switch repeats the sequence. Electronic sample and hold circuits may also be used.

The pulses for operating the sample and hold circuit 12 are obtained from a timing system 14 which is driven by a clock pulse source 16, such as a frequency controlled multivibrator. The repetition rate of these clock pulses is indicated as being 2KLM (viz. twice the product of rates K, L and M). M is the number of observables. L is the number of ouptut bits required for classification of a pattern group. Thus, if 32 alpha-numeric characters are to be classified and a binary code is used to represent these characters, four bits are required. K is the number of bits in the digital number which expresses the weight attributable to an observable. A counter 18 divides the clock pulses by the rate K, so that pulses having the rate 2LM are generated. One half the period of these pulses of rate 2LM is the time slot allocated to each observable. A pulse generator 20 derives a sampling pulse in response to the leading edges of the pulses generated by the counter 18 and applies these pulses to the sample and hold circuit 12. These sampling pulses occur at the beginning of the time slot for each observable. The pulse generator 20 may suitably be provided by a monostable multivibrator. The sample and hold circuit therefore provides an output indicated as $A_{ij}$, where the *i* corresponds to the time slot of the observable in which the output occurs and *j* represents its amplitude quantized to any one of N levels.

An analog to digital converter 22 translates each of these levels into a digital code having up to N bits. An arbitrary number of bits up to N may be used to represent each input observable. N is shown for the sake of generality. These bits are represented at the output of the converter 22 as $X_{i1}$ through $X_{iN}$. The N bits corresponds to the N voltage levels into which the converter 22 quantizes the output $A_{ij}$ from the circuit 12. The converter can be designed in accordance with known analog to digital converter design techniques to provide a one out of N binary code where the position of the "1" bit identifies the maximum level of the output $A_{ij}$ and the remaining bits are all "0's." A system of output gates in the converter 22 may be used to provide the one out of N code.

Figure 3:
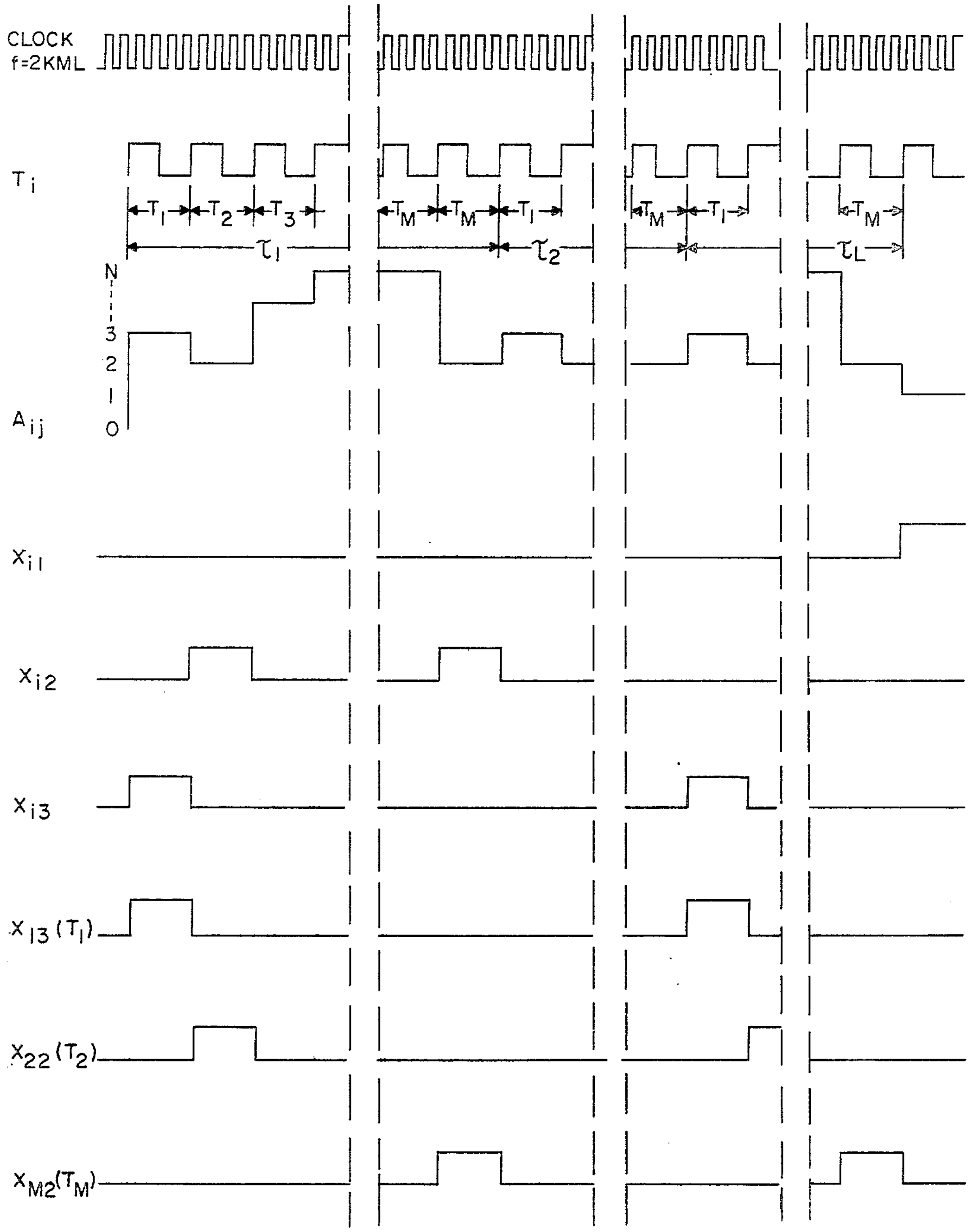
FIG. 3 is a chart showing the timing of different outputs in the system of FIG. 1.

The timing chart in FIG. 3 illustrates the clock pulses from source 16, the pulses from counter 18 (identified as $T_i$), and the input $A_{ij}$. It will be noted that a plurality of intervals or time slots $T_1$, $T_2$, $T_3$ . . . $T_M$–1 and $T_M$ occur during each sequence or scan. The sampled analog inputs to the converter 22 are illustrated in the waveform $A_{ij}$ in FIG. 3. The N levels are represented along the abcissa of the waveform. During each time slot $T_i$, a sample of a successive input $X_1$, $X_2$ . . . to $X_M$ is taken and held for that interval $T_i$. For example, the sample corresponding to $X_1$ observable at the output of the sensor 10–1 may be quantized as having an amplitude of three (3). The next observable $X_2$ at the sensor 10–2 output may provide a sample which is quantized at the two (2) level. The third input, for example, may have a four (4) level. The M–1 observable may similarly have a four (4) level, while the $X_M$ observable may again have a two (2) level. The analog to digital converter 22 in the time interval $T_1$, produces a pulse representing a one bit at its $X_{13}$ output and the first observable is therefore represented by a digital code which includes a "one" bit at the $X_{13}$ position and "zero" bits in the other N positions thereof. Similarly, the second observable is represented by the digital code produced at the output of the converter 22 in the time interval $T_2$. This code includes a "one" bit at the $X_{i2}$ position and "zero" bits at the other positions. The Mth observable is represented by a digital code at the output of the converter during the time interval $T_M$. Since the level of the $X_M$ observable which is detected upon sampling in the circuit 12 is quantized as a two (2) level, the digital code at the output of the converter has a "one" bit at $X_{i2}$ position and "zero" bits at the other positions.

Figure 2:
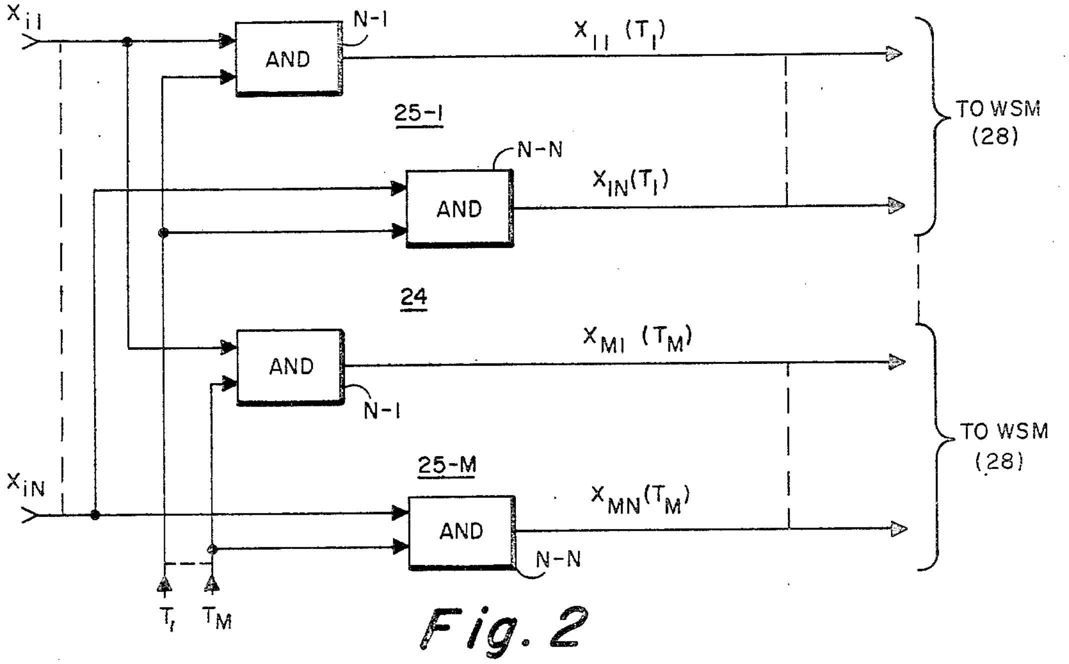
FIG. 2 is a more detailed block diagram of a portion of the system shown in FIG. 1.

The digital codes which represent each of the M observables are demultiplexed by a demultiplexer matrix 24. This matrix is illustrated in greater detail in FIG. 2. M groups 25–1 . . . 25–M of N gates N–1 . . . N–N are provided in the matrix 24. The first group of gates 25–1 is enabled by pulses which occur at time $T_1$. The second group 25–2 (not shown) is enabled by pulses which occur during the time interval $T_2$. The last group 25–M is enabled by pulses which occur during time interval $T_M$. The enabling pulses may be generated by means of a counter 26 (FIG. 1) which divides the output from the counter 18 by M. A decoder connected to the various stages of the counter 26 may be used to provide the various pulses at the successive intervals $T_1$ through $T_M$. At the output of the matrix 24 is provided M groups of binary codes, each occurring successively in each of the time intervals and each therefore being the code for a different observable 1 through M. The codes may be expressed generically as $X_{ij}$ ($T_i$), where $X_{ij}$ is the one out of N code produced at the output of the converter 22 and $T_i$ are the intervals of time $T_1$ through $T_M$.

There are therefore M groups having N output lines in each group which are provided at the output of the demultiplexer matrix 24. The successive outputs shown in FIG. 1 as $X_{11}$ ($T_1$) through $X_{MN}$ ($T_M$). The first output may carry a pulse in the time interval $T_1$ if a "one" bit appears in the first position of the digital code corresponding to the $X_1$ observable. The last output may occur during the time interval $T_M$ if the Nth bit of the code representing the Mth observable is a "one" bit. Referring to FIG. 3, a pulse appears in the matrix 24 output which is represented as $X_{13}$ ($T_1$). This output pulse, however, will occur during the $T_1$ time interval and represents a "one" bit in the third position of the one out of N code. An output pulse also occurs in the output line of the matrix 24 identified as $X_{22}$ ($T_2$) as well as on the line identified as $X_{M2}$ ($T_M$). The latter pulses similarily indicate a "one" bit in the second position of the one out of N code corresponding to the 2nd observable and a "one" bit in the second position corresponding to the Mth observable.

Each of these M groups of outputs is connected by way of weight selection matrices 28 to a weight register 30. The weight register 30 is a memory element which is capable of storing any binary coded weight from 0 to $2^K$–1. The outputs of the weight selection matrices 28 are connected to the appropriate bits of the weight register 30 so as to select the weight preassigned to any given input code. The weight register may be provided by a shift register having K bits. The bits are set into the register 30 by output pulses on the lines $D_1$ through $D_K$. Each numerical weight set into the register 30 may be represented as $W_{ijl}$ or an individual weight for each code *j*, for each observable *i*, and for each output bit *l*. Since these weights are registered sequentially, separate registers are not required for each weight. In other words, while there is provision for a separate weight for every observable in every pattern to be recognized, a single register provides all the memory that is needed. The advantage of reduction in complexity, number of parts and cost, therefore results.

Figure 4:
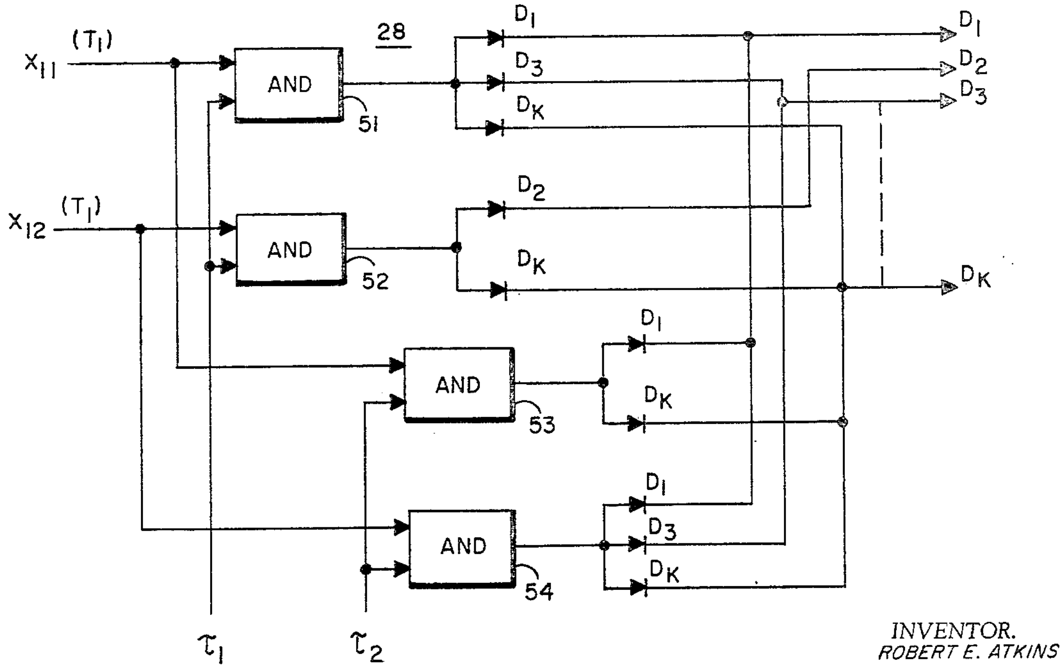
FIG. 4 is a block diagram illustrating in part the weight selection matrices shown in FIG. 1.

The matrices 28 themselves may include different code converting diode gates for each of the N codes which may appear in each of the M groups 25–1 through 25–M of AND gates (FIG. 2) which provides the separate codes for each observable. There are also L output bits needed in general for pattern classification. Thus, for each of the LMN possible combinations which are represented by the code for each observable, a different numerical weight may be registered in the register 30. The selection of the weights to be registered for each code may be accomplished by wiring a different diode code converting gate for the combination of bits individual to each weight. The L groups of MN gates may be selected sequentially by L pulses $\tau_1$ through $\tau_L$. These pulses may be obtained by a counter and decoder 32 (similar to the counter and the decoder 26) which divides the output of the counter and the decoder 26 by L. The decoder produces the pulses $\tau_1$ through $\tau_L$ successively and applies these pulses to the matrices 28 so as to enable successive ones of the L groups of diode gates. To illustrate the matrices 28, four of the gates, 51 to 54, and wiring for two digital codes corresponding to the first observable are shown in FIG. 4. The gate 51 is enabled by the $\tau_1$ pulse when the digital code for the first observable has a "one" bit in its most significant digit position. If the "one" bit is in the second most significant digit position, the gate 52 would be enabled by the $\tau_1$ pulse. The output of the gates are wired to different combination of weight register inputs through diodes which prevent unwanted current paths. Thus, a weight having "one" bits in the $D_1$, $D_2$ and $D_K$ positions is registered if the first observable were represented by a "one" bit in the most significant digit position of its corresponding code. A weight having "one" bits in the $D_2$ and $D_K$ positions would be registered if the "one" bit were in the second most significant digit position. The gates 53 and 54 are operative with the next group of matrix gates. Different wiring to the register for the same codes which represent the same observables exists from gates 53. The same weight may represent a different code for the same observable, as is illustrated by the output wiring of the gates 51 and 54. It will be understood, of course, that the wiring is shown solely for purposes of illustration.

In summary, the weight selection matrices 28 includes a separate diode matrix for each observable which converts the code for that observable into a set of inputs $D_1$ to $D_K$ to set a fixed weight of K bits in the register 30. Different diode matrices are used for each observable, since different weights may be needed for the same code which represents different observables. In addition, as many groups of such diode matrices are used as there are output bits required for classification. In the illustrated case, L groups are provided. Each group is utilized in sequence under the control of input pulses $\tau_1$ through $\tau_L$ derived by the counter and the decoder 32.

The bits are presented in parallel on the lines $D_1$ through $D_K$ which are connected to the weight register 30. In order to shift these bits into and out of the register 30 in proper time sequence, set pulses and advance pulses are derived from the timing system 14. A set pulse is produced a short time interval after the start of each of the sampling time intervals $T_i$ or at times $T_{(i+\Delta)}$. This set pulse may be generated by a pulse generator 34 which responds to pulses produced by the counter 18 at the leading edges thereof and delays such pulses by a time interval $\Delta$ sufficient to permit the sampling, conversation, demultiplexing and weight selection operations. The advance pulses are generated by a pulse generator 36 which is driven by the clock pulse source 16. The clock pulses themselves may be used if they are sufficiently short. These pulses have a frequency 2KLM. Accordingly, K advance pulses will be available to shift the bits stored in the weight register 30 out of the register before a new set of bits corresponding to the next observable is set into the register 30.

The bits are shifted out of the register into an accumulator which is a register capable of storing the sum of the weights which are read out of the register during each sequence or scan *l*. Since there will be M weights in each sequence *l*, the accumulator desirably has storage for M sets of bits. Sequential addition circuits of the type known in the computer art may be used as the accumulator. The pulse generator 36 provides advance pulses which shift the bits into the accumulator 40.

At the beginning of each scan sequence, a number is read out of a threshold register 46 into the accumulator 40 in response to an advance pulse produced by a pulse generator 42 at the leading edge of the output of the counter and decoder 26. The pulses occur at the beginning of each time interval $\tau_1$ (viz. $\tau_1, \tau_2 \ldots \tau_L$). The numbers in the threshold register are scaled so that for each advance pulse from the generator 42, a different number will be registered therein. The register may be a recycling counter which registers a number of successively lower value when it receives an advance pulse and recycles to present its initial number upon receipt of an Lth advance pulse. When the accmulator has accumulated the weights corresponding to the Mth observable, the most significant bit stored in the accumulator, $S_l$, will be a "one" bit if the sum of the weights is greater than the threshold value or a "zero" bit if the sum stored in the accumulator is less than or equal to that threshold number. These bits $S_l$ are stored sequentially as successive ones of L bits in an output register 44. This output register may be a shift register which is shifted by advance pulses from the pulse generator 42, which occur at each time interval $\tau_{1\Delta}$. After a time interval which is required to scan all of the L patterns, a read pulse is obtained from the output of the counter and decoder 32. This read pulse transfers the $L_1$ through $L_l$ output code into a display 48 This display 48 may include a series of lamps each corresponding to a different one of the patterns to be recognized. The display includes a decoder for translating the L bits stored in the output register into a signal for illuminating the desired lamp. Of course, the L bits may be read out into a computer or other data processing device or into a line for transmitting digital information corresponding to the pattern which is recognized as represented by the bits $L_1$ through $L_l$.

The section of the numerical values for the weights is accomplished by means of the weight selection matrices 28. The wiring of these matrices may be done in accordance with a predetermined schedule of weights. Adaptive or learning techniques may be used to derive these weights. An adaptive pattern classification system described in patent applications Ser. No. 202,525 and Ser. No. 202,529, both filed June 14, 1962 and assigned to the same assignee as the present application, now Patent Nos. 3,275,985 and 3,275,986, may be used for the purpose of ascertaining the schedule of weights which may be used in wiring the weight selection matrices 28. In accordance with the system described in this pattern application, variable weight registers are utilized for each observable and a threshold logic circuit is used to compare a digital code representing the recognized pattern with an arbitrary selected output code. The numbers stored in the weight registers are variable in order that the arbitrarily selected code will be produced in response to classification of the correct patterns. These weights produce a different code for each pattern to be classified. Accordingly, a schedule of weights may be derived for the desired pattern group which may be used in the wiring of the weight selection matrices.

From the foregoing descrption, it will be apparent that there has been provided an improved pattern recognition system suitable for recognizing various types of patterns. Various modifications and changes in the described system, may of course, become apparent to those skilled in the art. For example, the system may be adapted to scan groups of observables by optical scan techniques rather than use individual photoelectric sensing devices for each observable. Other modifications and variations in the described system will undoubtably suggest themselves to those skilled in the art. Accordingly, the foregoing description should be taken merely as illustrative and not in any limiting sense.

What is claimed is:

1. A system for recognizing a pattern having a plurality of observables, said system comprising (a) means for providing a sequence of digital codes each corresponding to a successive observable of the pattern to be recognized, (b) means having storage for a weight representing number, (c) accumulating means for accumulating the sum of a plurality of said weight representing digital numbers, (d) means responsive to each of said digital codes for converting said codes into selected individual ones of said weight representing numbers in said storage means, the selection depending upon the pattern to be recognized, (e) means for transferring said weight representing numbers into said accumulating means, and (f) logic means for classifying the pattern on the basis of successive sums stored in said accumulating means.

2. The invention as set forth in claim 1 wherein (a) said means for providing a sequence of digital codes is operative also to provide a plurality of iterations of said sequence, each of said iterations providing for the classification of one or more patterns, and (b) said converting means is operative to provide a different selection of said weight representing numbers respectively corresponding to different ones of said iterations.

3. The invention as set forth in claim 2 including a timing system comprising (a) means for producing a sequence of repetitive first pulses, (b) means for providing a plurality of second pulses respectively coincident with each of said first pulses, (c) means for providing a plurality of third pulses coincident with each sequence of first pulses, said plurality of third pulses including a number of pulses equal to the number of binary digits representing the patterns to be recognized, and wherein (d) said means for providing said sequence of digital codes is controlled by said first pulses and by said second pulses, and (e) said converting means is controlled by said third pulses to provide said different selections.

4. A pattern recognition system comprising (a) means for translating the pattern into a plurality of successive analog outputs corresponding respectively to the observables of the pattern, (b) means for quantizing said outputs into a succession of first digital codes which are functions of the significance of the observables corresponding thereto, (c) means for selecting in response to each of said succession of first codes, individual ones of a plurality of weights representing outputs having numerical values so as to produce a succession of said weight representing outputs corresponding to the observables of the pattern, and (d) means for accumulating the numerical values of the sum of the weight representing outputs in said succession thereof to provide a succession of outputs which provides a digital code representing the classification of the pattern.

5. The invention as set forth in claim 4 wherein said selection means comprises (a) means for converting each of said succession of first codes into a plurality of second codes respectively corresponding to different ones of said observables, and (b) means operated by said plurality of second codes for providing said individual weight representing outputs.

6. The invention set forth in claim 5 including means for conditioning said last-named means of said claim 5 for providing different groups of said weight representing outputs for each succession of first codes.

7. The invention as set forth in claim 5 wherein said last-named means of said claim 5 includes (a) a register having storage for a plurality of bits which constitute said weight representing outputs, and (b) means responsive to each of said plurality of second codes for setting said register to store a number constituting individual weight representing output corresponding thereto.

8. The invention as set forth in claim 7 wherein said last-named means in claim 7 includes a matrix for enabling said weight register to store different bits in response to different ones of said second codes.

9. The invention as set forth in claim 4 including threshold logic means coupled to said accumulating means for providing a binary output having opposite values depending upon whether or not said sum accumulated in said accumulating means exceeds a certain numerical threshold value.

10. The invention as set forth in claim 4 including (a) a register for storing a plurality of threshold numbers respectively corresponding to different patterns, and (b) means for sequentially comparing the sums accumulated in said accumulating means for each of successions of weight representing outputs with different ones of said threshold numbers for providing successive bits of a binary number representing the classification of the pattern to be recognized.

11. A pattern recognition system comprising (a) a plurality of sensors, each for providing outputs indicative of the analog value of a different element of the pattern, (b) means for sampling each of said outputs in succession and translating each of said outputs into a first succession of different digital codes in accordance with the analog value of each said output, (c) means for translating each of said digital codes into a second succession of individual digital codes which depend upon the first digital code and the element in the pattern corresponding thereto, (d) means responsive to each of said second succession of digital codes for accumulating the numerical value thereof, and (e) means for identifying a particular pattern on the basis of said numerical value.

References Cited

UNITED STATES PATENTS

| | | | |
|---|---|---|---|
| 3,167,745 | 1/1965 | Bryan | 340—146.3 |
| 3,177,469 | 4/1965 | Chow | 340—146.3 |
| 3,209,328 | 9/1965 | Bonner | 340—146.3 |
| 3,275,985 | 9/1966 | Dunn | 340—146.3 |
| 3,275,986 | 9/1966 | Dunn | 340—146.3 |
| 3,239,811 | 3/1966 | Bonner | 340—146.3 |
| 3,267,432 | 8/1966 | Bonner | 340—146.3 |

MAYNARD R. WILBUR, Primary Examiner

S. SHEINBEIN, Assistant Examiner

U.S. Cl. X.R.

179—1; 340—172.5